Patented Feb. 25, 1936

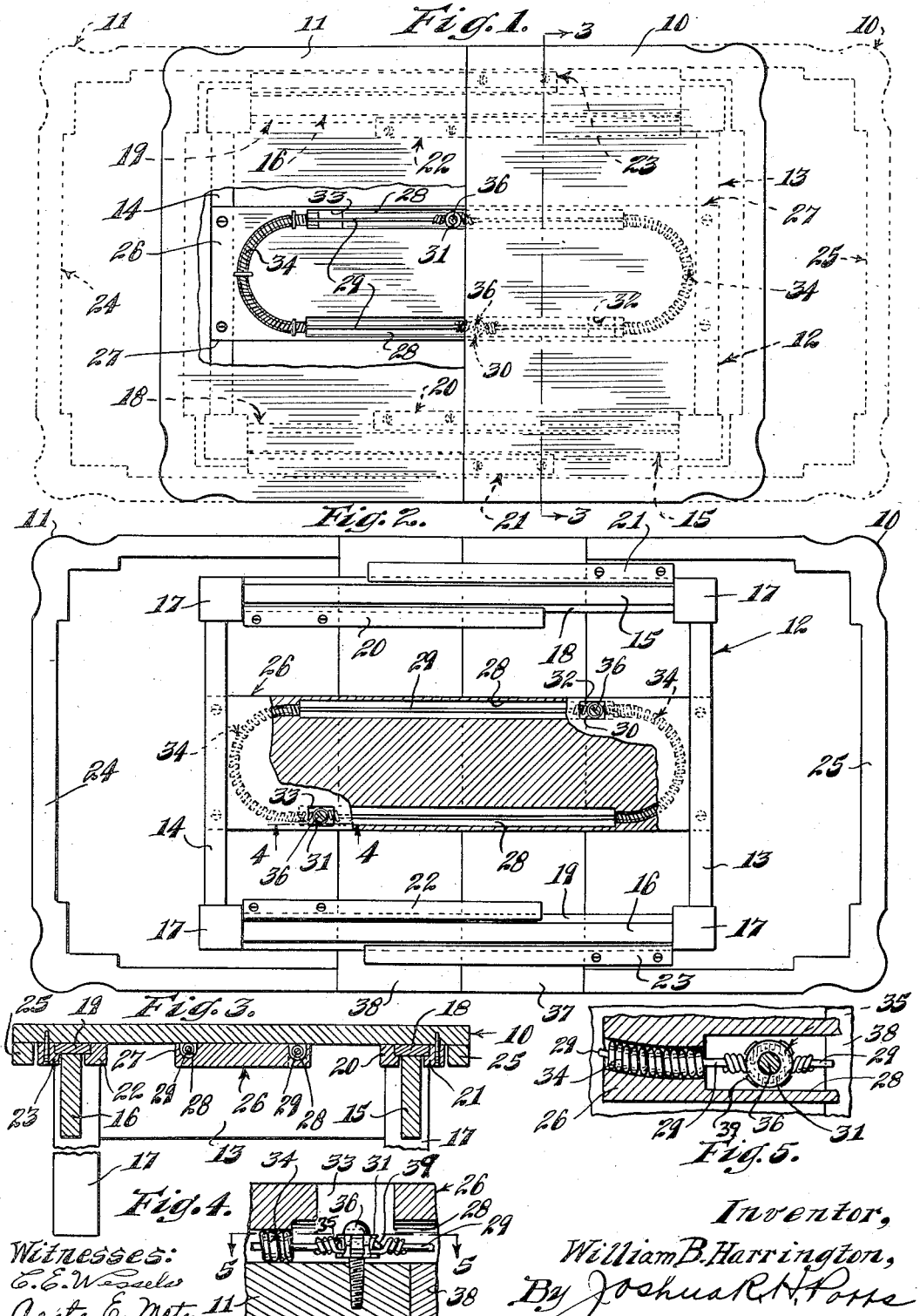

2,031,649

UNITED STATES PATENT OFFICE 2,031,649

EXTENSIBLE TABLE

William Benjamin Harrington, Milan, Ind.

Application March 14, 1934, Serial No. 715,415

4 Claims. (Cl. 311—75)

My invention relates to improvements in extensible tables and has for an object the provision of simplified structure by which a table of one dimension may be enlarged to greater dimensions so as to be of greater utility. Another object is to provide simplified structure by which the separable and relatively movable portions of the table top may be caused to remain equalized with relation to each other when being extended.

Another object of my invention is to provide equalizing structure which is extremely simple in construction and because of this simplicity is of extremely low cost. I am aware of the fact that other structures performing similar functions have been heretofore provided, but in many instances the cost of those structures has been prohibitive. Their structures have likewise been complicated, heavy, and of such a nature that they require extensive changes in and additions to the structure of the table. My invention obviates these difficulties and performs its functions with a high degree of efficiency.

Other objects will appear hereinafter.

My invention may be best understood by reference to the accompanying drawing, in which:

Fig. 1 is a top plan view of my extensible table having certain parts thereof broken away for the purposes of illustration;

Fig. 2 is a bottom plan view with parts broken away;

Fig. 3 is a sectional view taken substantially on the line 3—3 of Fig. 1;

Fig. 4 is a detail view in section taken substantially on the line 4—4 of Fig. 2; and Fig. 5 is a detail view in section taken substantially on the line 5—5 of Fig. 4.

Referring now to Figs. 1 and 2, my invention comprises two separable table portions 10 and 11. The portions 10 and 11 may receive their vertical support and rest their weight upon an understructure 12 having end members 13 and 14, side members 15 and 16, and supporting legs 17. The separable table portions 10 and 11 are separable in the direction of the greatest dimension of understructure 12 as can be seen clearly from Figs. 1 and 2.

Referring now to Fig. 3, the table portions 10 and 11 rest directly upon slides 18 and 19 which are supported on the upper edges of side members 15 and 16 respectively. The slides 18 and 19 are of greater cross-sectional dimension than the upper edges of side members 15 and 16, and the edges of said slide members extend on opposite side faces of members 15 and 16. A retaining slide bar 20 is secured on the lower face of table portion 11 and extends parallel to said face in the direction of table portion 10 and extends substantially to the end member 13. The outer, upper edge of retaining slide bar 20 is rabbeted to receive the edge of slide 18 which extends past the inner side face of side member 15. A slide retaining bar 21 is secured to the under face of table portion 10 and extends parallel to the face thereof across the meeting edges of table portions 10 and 11 and substantially to end member 14. In a manner similar to retaining slide bar 20 the upper, inner edge of bar 21 is rabbeted to receive the outer longitudinal edge of slide 18. On the opposite side of the table a retaining slide bar 22 is secured to table portion 11 and extends beneath and parallel to the face of table portion 10. Its construction and dimensions are similar to retaining slide bar 20. A retaining slide bar 23 is secured to the under face of table portion 10 opposite the side to which retaining slide bar 21 is secured. Construction, dimensions, and operation of retaining slide bar 23 are similar to those of retaining slide bar 21. It is obvious that the purpose of retaining slide bars 20, 21, 22, and 23 is to prevent the opposite ends of the table from tilting when the table portions 10 and 11 are in extended position as shown in dotted lines in Fig. 1, that is, the retaining slide bars retain the table members or portions 10 and 11 on slides 18 and 19 and thus in a horizontal position in the same plane. A depending skirt 24 extends downwardly from table member 11 and a similar skirt 25 extends downwardly from table member 10. The function of skirts 24 and 25 is obviously mainly for decoration.

An equalizing track member 26 spans the distance between end members 13 and 14 and lies in a plane parallel to the lower faces of table members 10 and 11, and the plane of its upper face is in close proximity to the plane of the lower faces of said table members. The opposite ends of equalizing track member 26 extend through appropriate cut-outs 27 in the upper edges of end members 13 and 14 and are secured to said end members by appropriate screws.

The upper face of equalizing track member 26 preferably carries an endless, substantially oval-shaped grooved track 28. The groove 28 is preferably as long as the equalizing track member 26 will permit, and thus the curved ends of track 28 are in close proximity to the inner vertical faces of end members 13 and 14.

A continuous loop or equalizing member 29 is arranged in groove 28. I preferably form the member 29 of piano wire or similar substance and form eyes 30 and 31 in said equalizing member 29 at points on the opposite sides of said member 29. Referring to Fig. 1, I preferably secure the eye 30 adjacent the inner edge of table member 10 and preferably secure the eye 31 to the inner edge of table member 11. Appropriate screws 36 may be employed for this purpose and appropriate vertical slots 32 and 33 are formed on opposite sides of equalizing track member 26 for the purpose of attaching the eyes 30 and 31 to table members 10 and 11 respectively after said table members have been placed above equalizing track member 26. The assembly is thus made relatively simple since the table members and supporting structures may be made independently of each other in their entirety and then assembled as described.

In the opposite curved ends of track 28 I preferably arrange tubular coil springs 34 for the purpose of reducing friction and providing an efficient guide for equalizing member 29. If the member 29 is made of piano wire it slides very freely in the coils of springs 34.

A detail view of the attachment of the eye 31 to table member 11 is shown in Fig. 4. Likewise the method of attaching the eye 31 to the member 29 is shown. The eye 31 comprises an annular body having a dished vertical edge 35 which is similar in formation to the groove of a pulley wheel. Loose ends of piano wire may be laid in the groove 31 in diametrically opposite portions thereof, overlapped and each loose end twisted over and around the overlapped wire.

Additional support for maintaining the ends of the wire in the dished portion of the eyes 31 may be afforded by laterally extending ears 39 which may be bent over the wires in the groove or dished portion after the ends of the wires have been twisted around the overlapped portions of the wires. The ears 39 also assist in maintaining the wires in their curved positions and thus give added strength to the joint established between the two wires.

The operation of my device is easily understood from the foregoing description, and it can be seen in Fig. 2 how the parts operate. In this figure the two table members 10 and 11 have been separated and a pair of extension leaves 37 and 38 inserted. By the movement of the table member 11 into extended position the equalizing member 29 causes table member 10 to move in an opposite direction and also to extended position. Likewise, when one table member is moved toward the other one the equalizing member 29 pulls the other table member toward the one which is being moved. Since the movement of one table member in either direction causes an equal movement of the other table member in an opposite direction the two members are always in equalized relation to the supporting structure of the table. The curved portions of the track are preferably spaced a considerable distance apart so that the table may be extended an appreciable distance. The curved portions should be made on a radius sufficiently great so that the flexible equalizing member will not be compelled to be bent in too sharp a turn at either end of the track.

While I have shown and described my preferred form of construction, I do not wish to be limited to the details herein shown and described, but wish to avail myself of all variations coming within the scope of the appended claims.

Having thus described my invention, what I claim as new and desire to secure by Letters Patent is:

1. A device of the character described comprising a table supporting structure, a pair of coplanar table members adapted to form a continuous table when their edges are pressed together, and equalizing and actuating means for controlling and effecting the movements of said table members relative to each other and the table supporting structure, said means comprising a substantially flat member having an elongated closed guide groove channel therein opening toward the under faces of said table members and a flexible equalizing member arranged in said guide groove channel and secured at one point to one of said table members and at another point to the other of said table members.

2. A device of the character described comprising a table supporting structure, a pair of coplanar table members adapted to form a continuous table when their edges are pressed together, and equalizing and actuating means for controlling and effecting the movements of said table members relative to each other and the table supporting structure, said means comprising a guide groove having curved portions, and a flexible equalizing member arranged in said guide groove and secured at one point to one of said table members and at another point to the other of said table members, and coil spring housing members arranged in the curved portions of said guide groove for the purpose of receiving said flexible equalizing member.

3. A device of the character described comprising a table supporting structure, a pair of coplanar table members adapted to form a continuous table when their edges are pressed together, and means for automatically controlling the movement of said table members relative to each other and the table supporting structure, said means including a loop-like flexible equalizing member secured at one point to one of said table members and at another point to another of said table members in a substantially closed fixed guide channel therefor.

4. A device of the character described comprising a table supporting structure, a pair of coplanar table members adapted to form a continuous table when their edges are pressed together, and means for moving said table members to and from each other and for automatically controlling the movement of said members relative to each other, said means including a loop-like flexible equalizing member secured at one point to one of said table members and at another point to another of said table members in a substantially closed fixed guide channel therefor.

WM. BENJAMIN HARRINGTON.